Feb. 11, 1964 R. L. HOLLINGSWORTH 3,120,992
AUTOMOBILE TRAFFIC SURVEILLANCE APPARATUS
AND SPEED MEASUREMENT EQUIPMENT
Filed June 16, 1960
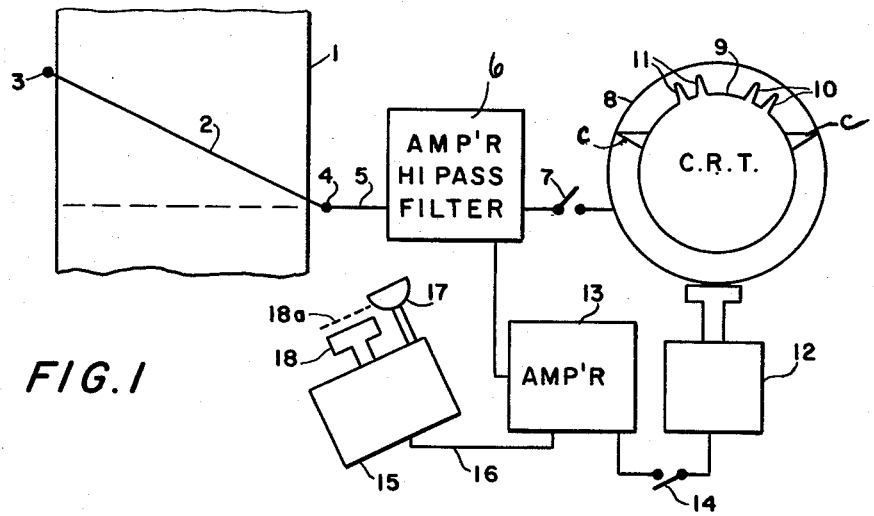
FIG.1
FIG.3
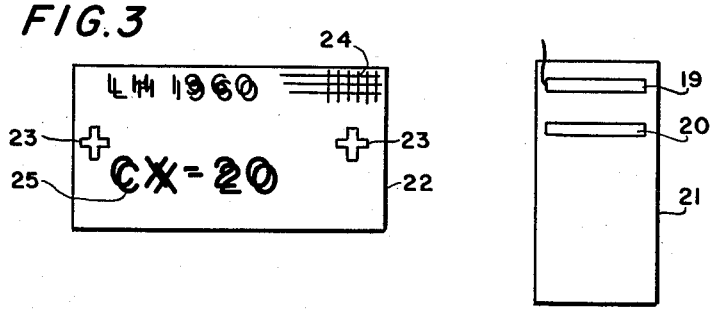
FIG.2
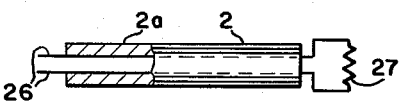
FIG.4
R. LEE HOLLINGSWORTH
*INVENTOR.*
BY *Albert H. Jacobs*
ATTORNEY United States Patent Office 3,120,992
Patented Feb. 11, 1964

3,120,992
AUTOMOBILE TRAFFIC SURVEILLANCE APPARATUS AND SPEED MEASUREMENT EQUIPMENT
R. Lee Hollingsworth, 110 Fox Blvd., Massapequa, N.Y.
Filed June 16, 1960, Ser. No. 36,685
8 Claims. (Cl. 346—107)

The present invention pertains to traffic surveillance, visual observation of traffic speeds, the photographic measurement of speed and owner identification of the vehicle by photographing the license plate with at least two exposure apertures on preferably a roll type shutter, as in a Graflex camera having two exposure apertures on one shutter area, with means to check the shutter speed on each photograph made.

The purpose of the invention are, in part, to photograph the license plate of a speeding vehicle with a camera having mechanisms capable of sensing that the vehicle is exceeding a predetermined speed. This sensing device operates the camera and causes a photographic record to be made of the license plate and of the car through a double exposure shutter in the camera. The license plate number and the speed of the car are readily determined for the number is shown and the speed is indicated by the distance on the picture between the two exposures; the shutter speed is checked against a standard exhibited array of timing impulses on a cathode ray tube which is positioned to be in the pictures.

Another purpose is to photograph a portion of a speeding vehicle including its license plate, and to present images on an oscillograph resulting from the wheels of a vehicle actuating a positioned sensing means, which in turn causes the photograph to be made.

Another purpose is to provide a measuring camera suitable for foot patrolmen. The camera would have a double exposure shutter which would take two pictures of a speeding vehicle and its license plate. The pictures may be snapped through a calibrated screen means placed adjacent to the lens of the camera. The pictures are preferably made with Polaroid film, and may be quickly compared with a prepared standard, namely photographs of a license plate traveling at less than the speed limit to determine the speed travelled during the time between the double shutter exposure. This Polaroid picture would be matched against a group of pictures taken at defined distances. They would be prepared in a bound book-like package suitable for making quick comparisons between the instant photograph and its closest match in the package.

Such a camera means can be made suitable for carrying by all policemen so that they could record the speed and identity of a speeding car. By the use of Polaroid film which develops the pictures quickly, a call to a local license bureau would quickly determine the owner of the car. Furthermore, the dangerous chasing of speeders could be avoided in that all mobile police could be alerted for the speeder on the loose. In addition, a summons could be mailed on the strength of the photo speed measuring according to the present invention.

The accompanying drawing represents one embodiment of the present invention wherein:

FIGURE 1 is a schematic and diagrammatic representation of a preferred embodiment;

FIGURE 2 is a roll or rotor type shutter;

FIGURE 3 is a front view of a picture of a license plate when photographed on a moving vehicle;

FIGURE 4 is a sensing means used in the invention.

In FIGURE 1, a cutaway section of a highway is indicated at 1. A cable 2 which includes means for sensing the passing wheels of an automobile is shown placed across said highway at an angle. Other means of detection may be used as it is intended that the invention not be limited to a single means of detection or sensing. Cable 2 is anchored by stake means 3 and 4. Lead 5 connects the sensing means 2 to amplifier 6. This lead 5 may be as long as is necessary and could, for example, be one or more miles long; this extended length may lead to a short wave radio receiver at a forward check point to allow a traffic officer to be forewarned of an approaching speeder. Amplifier 6 also contains a high pass electric wave filter which rigidly rejects the impulses caused by the passage of automobile wheels actuating the sensing means 2 when travelling at speeds below the lawful or predetermined maximum allowable speed, but which passes high speed impulses 10 and 11 to beam circle pattern 9 of cathode ray tube (CRT) 8, via switch 7 and to amplifier 13. Pulses 10 and 11 are generated by the wheels traversing the cable or sensing means 2. The circle pattern 9 has constant frequency pulses C which are produced by energy from a constant frequency oscillator within the cathode ray oscillograph unit 8. The distance between each pair of pulses is indicative of the speed of the car, particularly when the make and model of a car is known, which may be determined by the picture or by the information taken from the record of registration in the license bureau. The view shown on the cathode ray tube may be photographed by camera 12, or by properly positioning the cathode ray tube, camera 15 may take a picture of both the license plate and the CR tube. Electrically operated shutter means within the camera are operated accurately by the pulses received from the sensing cable means 2 via amplifier 6, and through high pass filter means therein, and through amplifier 13 and switch 14. When cathode ray tube 8 is positioned to be photographed by camera 15, switch 14 is opened. The filtering used in the invention is commonly used in the field of electric wave energy for communication, and is therefore not here illustrated. The camera shutters are self restoring, and the film is self winding, one frame at a time past the lens exposure area in the usual manner by electric pulses 10 and 11. Delay lines may be inserted in the circuits to provide synchronizing means between the various operating elements actuated by the pulses from the sensing means 2. These delay lines are also of common usage and are therefore not here illustrated. The mechanisms for accomplishing the camera shutter action and the movement and storage of the exposed film are well known and are also not here illustrated.

It is to be appreciated that the oscillation generator within the cathode ray oscillograph unit may be rigidly stabilized by means well known in the communications art. Furthermore, the cathode ray tube presentation may be placed in each exposure or in the next instantly exposed frame of a camera. Constant frequency pulses C are standard time pulses imposed on the circle pattern 9 and are described in my pending patent application Serial Number 680,884, filed August 26, 1957, and my Patent No. 2,075,285.

The angle of the cable sensing means 2, positioned across the highway 1, may be made very acute, to the point of being almost perpendicular to the longitudinal axis of the road and when so positioned the time difference at which the front and rear wheels of short axled cars and standard length axled cars strike the cable would be minimized. It is to be understood that the speed at which the wheels strike the sensing means determines the width of pulses 10 and 11; thus if a pre-determined speed is being exceeded these pulses will be narrower and closer together whereas they will be broader when the speed of the car is closer to predetermined speed limit. With the picture identification of the license plate the dimensions of the car can be readily determined when the registration details are obtained for checking against the pulses generated by the wheels striking the sensing means 2.

Photographic traffic surveillance utilizing the apparatus of FIGURE 1 includes in the system camera 15, which is shown connected to amplifier 13 by connecting lead 16. When impulses are received from cable 2 via amplifiers 6 and 13, the shutter of camera 15 is operated substantially simultaneously with flash lamp 17. The rear of the car and the license plate are photographed through lens 18, and calibrated screen means 18a which is positioned similar to a range finder marking in relation to the lens. It is preferred that the shutter in the camera 15 have two exposure areas for exposing two pictures in each film frame, in the general manner as shown in FIGURE 2, illustrated by apertures 19 and 20 in roll shutter 21. The roll type shutter has been used for many years in Graflex cameras with a single aperture within the area utilized for exposing one picture at a given rate of speed. When the camera 15 photographs the license plate of a moving automobile, with a delayed second exposure such as would be accomplished with the shutter action of FIGURE 2, the measurable travel time and the rate of the car's speed is recorded on the film in the form of distance on the picture between like markings on the two exposures. A calibrated screen 18a may cover the camera lens to uniformly divide the picture into many small portions to facilitate determining the speed. This screen means serves as a form of range finder and a distance indicating factor on the picture between the two exposure distances. Crosses 23 on the license plate of FIGURE 3 are shown without the double exposure effect, to illustrate a license plate having, for example, Scotch Light reflecting configurations thereon to better reflect light from the flash lamp 17, back to the camera to establish a uniform configuration and more sensitive to produce a greater degree of light reflection than other parts of the automobile. All States and countries might agree on a uniform marking and printing, or on a standard size license plates using reflective materials and markings, to standardize traffic surveillance in accordance with the present invention. Screen means 24 is representative of integrated picture areas. License plate numbers are shown at 25.

FIGURE 4 illustrates a cable or sensing means 2, which is capable of registering instantaneous variations due to sudden pressure. The resilient material 2a surrounds and holds in electrically balanced position alternating current transmission lines 26, to which a terminating load resistance 27 is attached at the end opposite the source; the source is not shown in FIGURE 4. A source of energy connected to speed sensing means 2, may be contained in amplifier-translator means 6 if desired. Properly terminated, there are no standing waves or reflections of current or voltage component differences along the line. Now if the line is suddenly compressed to change the impedance of the line, there is a power disturbance noted in both the feed and load. This variation registers through the translator-amplifier means 6 on the cathode ray tube 8 of FIGURE 1, and operates cameras 12 and 15 as desired. This type of cable is also responsive to vibrations and noise compressions both in and out of water, and represents also a microphone or hydrophone means capable of listening uniformly over a wide area. If the feed or supply to sensing means 2 be an oscillator, the line impedance variation due to applied pressures, frequency or phase modulates the oscillator. These modulations are detected in the usual manner by frequency and phase detection means (not shown) associated with such oscillator, the output of which in operation is fed into amplifier-translator means 6. A frequency or phase modulation receiver may also be connected to the load end of the transmission line instead of only the terminating resistance 27 connected to lines 26, to allow observation at both ends of the line. This cable, or sensing means 2, may be constructed in concentric line fashion, where the outer shell portion acts as a circular enclosed shield for the inner conductor supported centrally of the outer concentric shield.

It is to be appreciated that the same type of flash camera, when carried by a policeman, and built to be light and highly transportable may be used to photograph the license plate of any car at any practical distance, and when this license plate picture is quickly developed and compared in size to a group of pictures of a license plate previously established as a standard distance reference, for all cameras of rigid similarity, the speed of the car instantly photographed can be readily determined by the double exposure travel on the instantly taken picture, or by the dimension of the picture when related to the standard size pictures. The group of standard sized pictures are precision made and preferably bound to facilitate visual comparison. The distinctive markings on FIGURE 3, namely the crosses, or other suitable markings, assist in making comparisons here referred to in the steps of determining the speed of a car after the picture is taken and developed.

The methods of determining the speed of a car as herein described may be used simultaneously or separately to fit any requirement. The cathode ray indicating means of FIGURE 1 may be replaced with a rotating neon lamp device. However, the cathode ray tube is usually much preferred as an indicating means. Other and additional uses will be appreciated by those skilled in the art by reference to this disclosure and the appended claims.

I claim:
1. A traffic surveillance system for detecting vehicles traveling on a highway faster than a predetermined speed which comprises:
   (a) vehicle sensing means traversing said highway;
   (b) amplifying and high pass filter means electrically connected to said sensing means;
   (c) a cathode ray oscillograph electrically connected to said amplifying and filter means; and
   (d) at least one camera connected to said amplifying and filter means whereby vehicles traveling at a speed in excess of a predetermined one cause pulses which produce patterns on said oscillograph and said oscillograph patterns and the rear portions of the vehicles including their license plates are photographed by said at least one camera which is actuated by said pulses.

2. A traffic surveillance system according to claim 1 wherein:
   (a) said camera has two exposure areas so that two pictures are exposed on each film frame; and further comprising
   (b) light-producing means connected to said camera in synchronization therewith.

3. A traffic surveillance system according to claim 1 which further comprises a calibrated screen placed in front of the lens of said camera so that each picture will have said calibration superimposed thereon to facilitate calculation of the speed of the vehicle.

4. A traffic surveillance system according to claim 1 wherein said vehicle sensing means is a cable comprising:
   (a) a plurality of alternating current transmission lines;
   (b) a terminating load resistance connected to said lines at one end thereof; and
   (c) a resilient material encasing said lines and said resistance.

5. A traffic surveillance system for detecting vehicles traveling on a highway faster than a predetermined speed which comprises in combination:
   (a) a cable which comprises:
      (1) a plurality of alternating current transmission lines;
      (2) a terminating load resistance connected to one end of said lines; and
      (3) resilient material encasing said line and said resistance said cable being disposed across said highway at an acute angle with respect to the longitudinal axis of the highway;

(b) an amplifier and high pass filter electrically connected to said cable whereby said amplifier amplifies pulses resulting from vehicles passing in contact with said cable and said high pass filter transmits only those pulses which are caused by vehicles contacting said cable at a speed faster than the predetermined one;

(c) a cathode ray oscillograph electrically connected to said amplifier and high pass filter;

(d) an additional amplifier connected to said amplifier and high pass filter;

(e) at least one camera having a roll type shutter with a pair of apertures therethrough, said camera being connected to said additional amplifier whereby the pulses amplified and passed through said high pass filter cause patterns on said oscillograph and are transmitted to said additional amplifier from whence said pulses energize said at least one camera so that the patterns appearing on said oscillograph and the rear portion of the vehicle causing the pulses including its license plate are photographed.

6. A traffic surveillance system according to claim 5 wherein (a) said camera has two exposure areas so that two pictures are exposed on each film frame; and further comprising (b) light-producing means connected to said camera in synchronization therewith.

7. A traffic surveillance system according to claim 6 which further comprises a calibrated screen placed in front of the lens of said camera so that each picture will have said calibration superimposed thereon to facilitate calculation of the speed of the vehicle.

8. A traffic surveillance system for detecting vehicles traveling on a highway faster than a predetermined speed which comprises:

(a) a cable which comprises:

(1) a plurality of alternating current transmission lines;

(2) a terminating load resistance attached to one end of said lines; and (3) resilient material encasing said lines and said resistance said cable being disposed across said highway at an acute angle with respect to the longitudinal axis of the highway;

(b) an amplifier and high pass filter electrically connected to said cable whereby said amplifier amplifies pulses resulting from vehicles passing in contact with said cable and said high pass filter transmits only those pulses which are caused by vehicles contacting said cable at a speed faster than the predetermined one;

(c) a cathode ray oscillograph electrically connected to said amplifier and high pass filter;

(d) an additional amplifier connected to said amplifier and high pass filter;

(e) a first camera electrically connected to said additional amplifier so as to be activated by said pulses and disposed adjacent said oscillograph so that the patterns appearing on said oscillograph caused by said pulses are automatically photographed;

(f) a second camera electrically connected to said additional amplifier disposed adjacent said highway, said camera having a roll type shutter with a pair of apertures therethrough;

(g) a flash gun connected to said second camera in synchronization therewith; and (h) a calibrated screen disposed in front of the lens of said second camera, said second camera being disposed with respect to said highway so as to photograph the rear portion of a speeding vehicle including the rear license plate thereof upon activation from the pulses caused by said speeding vehicle.

References Cited in the file of this patent

UNITED STATES PATENTS

| | | |
|---|---|---|
| 2,178,315 | Sweetland | Oct. 31, 1939 |
| 2,181,728 | Greentree | Nov. 28, 1939 |
| 2,314,254 | Temple | Mar. 16, 1943 |
| 2,358,777 | Rappleyea | Sept. 26, 1944 |
| 2,419,099 | Wall | Apr. 15, 1947 |
| 2,519,634 | Burton | Aug. 22, 1950 |
| 2,521,667 | Neyhart | Sept. 5, 1950 |
| 2,619,402 | McCutcheon | Nov. 25, 1952 |
| 2,676,084 | Bateman et al. | Apr. 20, 1954 |
| 2,742,834 | Kondolf | Apr. 24, 1956 |
| 2,769,148 | Clogston | Oct. 30, 1956 |
| 2,785,395 | Platzman | Mar. 12, 1957 |
| 2,795,273 | Putnam | June 11, 1957 |
| 2,810,892 | Blitz | Oct. 22, 1957 |
| 2,927,836 | Shore | Mar. 8, 1960 |
| 2,927,837 | Martin | Mar. 8, 1960 |
| 2,938,201 | Thornton | May 24, 1960 |
| 3,060,434 | Biedermann et al. | Oct. 23, 1962 |

FOREIGN PATENTS

| | | |
|---|---|---|
| 1,054,757 | Germany | Apr. 9, 1959 |

OTHER REFERENCES

Photographic Engineering, vol. 1, No. 1, January 1950, pages 27–36 and 73–75.